US012563503B2

(12) United States Patent     (10) Patent No.:   US 12,563,503 B2
Lamm et al.     (45) Date of Patent:    Feb. 24, 2026

(54) CLOSED LOOP POWER CONTROL FOR UPLINK CARRIER AGGREGATION

(71) Applicant: Telefonaktiebolaget LM Ericsson (publ), Stockholm (SE)

(72) Inventors: Anders Lamm, Mölndal (SE); Pär Ankel, Nödinge (SE); Holger Urban Bergström, Lerum (SE); Lars Rönnborn, Pixbo (SE); Andreas Andersson, Landvetter (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 328 days.

(21) Appl. No.: 18/552,879

(22) PCT Filed: Apr. 6, 2022

(86) PCT No.: PCT/SE2022/050345
§ 371 (c)(1),
(2) Date: Sep. 27, 2023

(87) PCT Pub. No.: WO2022/216210
PCT Pub. Date: Oct. 13, 2022

(65) Prior Publication Data
US 2024/0196342 A1     Jun. 13, 2024

Related U.S. Application Data

(60) Provisional application No. 63/172,412, filed on Apr. 8, 2021.

(51) Int. Cl.
*H04W 52/36*     (2009.01)
*H04W 52/08*     (2009.01)

(52) U.S. Cl.
CPC ......... *H04W 52/365* (2013.01); *H04W 52/08* (2013.01); *H04W 52/367* (2013.01)

(58) Field of Classification Search
None
See application file for complete search history.

(56) References Cited

U.S. PATENT DOCUMENTS

2014/0221038 A1   8/2014   Nakashima et al.
2020/0068499 A1*   2/2020   Ryoo ..................... H04W 76/15
(Continued)

FOREIGN PATENT DOCUMENTS

CA     3130418 A1     8/2020
EP     2618498 A1     7/2013
(Continued)

OTHER PUBLICATIONS

Kim et al. "Power headroom report-based uplink power control in 3GPP LTE-A HetNet", EURASIP Journal on Wireless Communications and Networking (2015) 13 pages.
(Continued)

*Primary Examiner* — Fadi Haj Said
(74) *Attorney, Agent, or Firm* — Rothwell, Figg, Ernst & Manbeck, P.C.

(57) ABSTRACT

According to an aspect, there is provided a method performed by a base station for adjusting a transmission power of a primary cell of a cell group. The method comprises receiving (302), from a wireless device, an indication of a first power headroom associated with the primary cell; determining (304) a power headroom target; comparing (306) the first power headroom and the power headroom target; and determining (308) whether to adjust a transmission power of the primary cell based on the comparison.

18 Claims, 15 Drawing Sheets

(56) References Cited

U.S. PATENT DOCUMENTS

| | | | |
|---|---|---|---|
| 2021/0037482 A1 | 2/2021 | Shin et al. | |
| 2021/0144657 A1* | 5/2021 | Ang | H04W 52/0261 |
| 2023/0209479 A1* | 6/2023 | Cheng | H04W 52/365 |
| | | | 370/318 |
| 2023/0337150 A1* | 10/2023 | Liu | H04W 52/325 |

FOREIGN PATENT DOCUMENTS

| | | | |
|---|---|---|---|
| EP | 2830245 A1 | 1/2015 |
| EP | 2854460 A1 | 4/2015 |
| EP | 3116259 A1 | 1/2017 |
| WO | 2010/065759 A2 | 6/2010 |
| WO | 2010/124745 A1 | 11/2010 |
| WO | 2011/139200 A1 | 11/2011 |
| WO | 2016/137816 A2 | 9/2016 |
| WO | 2017/024432 A1 | 2/2017 |

OTHER PUBLICATIONS

Yang et al. "An Advanced Power Control Algorithm Based on PHR in LTE-A PUSCH", International Conference on Computational Intelligence and Communication Networks (2015) 4 pages.

Research In Motion UK Limited, "Uplink Power Control for Carrier Aggregation", 3GPP TSG RAN WG1 Meeting #58, RI-093297, Shenzhen, China, Aug. 24-Aug. 28, 2009, 3 pages.

Nokia Siemens Networks, Nokia Corporation, "Power headroom reporting for uplink carrier aggregation", 3GPP TSG RAN WG1 #61 Meeting, RI-102946, Montreal, Canada, May 10-14, 2010, 4 pages.

International Search Report and the Written Opinion of the International Searching Authority, issued in corresponding International Application No. PCT/SE2022/050345, dated May 30, 2022, 18 pages.

* cited by examiner

Throughout (Mbps)

Distance (m)

Throughout (Mbps)

Distance (m)

Receive, from a wireless device, an indication of a first power headroom associated with a primary cell of a cell goup — 302

Determine a power headroom target — 304

Compare the first power headroom and the power headroom target — 306

Determine whether to adjust a transmission power of the primary cell based on the comparison — 308

CLOSED LOOP POWER CONTROL FOR UPLINK CARRIER AGGREGATION

CROSS REFERENCE TO RELATED APPLICATION(S)

This application is a 35 U.S.C. § 371 National Stage of International Patent Application No. PCT/SE2022/050345, filed Apr. 6, 2022, which claims priority to U.S. Provisional Application No. 63/172,412, filed Apr. 8, 2021, which is incorporated herein by this reference.

TECHNICAL FIELD

This disclosure relates to adjusting a transmission power of a primary cell in a cell group, such as a Primary Cell (PCell) in a Master Cell Group (MCG) or a Primary Secondary Cell (PSCell) in a Secondary Cell Group (SCG).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Uplink (UL) power control determines a power for Physical Uplink Shared Channel (PUSCH), Physical Uplink Control Channel (PUCCH), Sounding Reference Signal (SRS) and Physical Random Access Channel (PRACH) transmissions. In the Third Generation Partnership Project (3GPP) standard TS 38.213 v15.10.0 (2020-06), the user equipment (UE) determines the PUSCH transmission power $P_{PUSCH}$ as $$P_{PUSCH}=\min(P_{max}, P_0+10 \log(2^u \cdot M)+\alpha \cdot PL+\Delta_{TF}+f) \\ [dBm] \quad [1]$$

where
  $P_{max}$ is the UE configured maximum output power;
  $P_0$ is the power spectrum density target per Physical Resource Block (PRB) and it is signalled to the UE;
  M is the number of PRBs that is used by the uplink transmission and u is a Sub-carrier spacing (SCS) configuration defined in [3GPP TS 38.211 v15.10.0 (2020-06)];
  $\alpha$ is the fractional pathloss power control fraction. When it is equal to 1, full pathloss is compensated, while it is smaller than 1, the pathloss is partly compensated by the UE transmit power. The objective is to reduce the potential generated inter-cell interference;
  PL: the UE estimated pathloss;
  $\Delta_{TF}$: a factor depending on the selected transport format; and
  f: is the closed loop transmit power control (TPC) command that is signalled from the gNB to the UE.

According to the standards, TPC command comes with step sizes of −1 dB, 0 dB, +1 dB and +3 dB. The gNB, based on the measured signal quality, performs fast closed loop power control (CLPC) to decide whether to raise or lower the UE transmit power.

In brief, according to above when the UE typically is located or moves further away from the gNodeB and the pathloss increases, the UE will transmit more power up to a maximum defined power.

When two or more UL carriers are used i.e. being scheduled, the UE will calculate transmission power per carrier independently according to Equation [1]. If total power (i.e. the sum of power per carrier) exceeds the maximum allowed transmission power the UE shall prioritize power for PUSCH according to below part of chapter 7.5 Prioritizations for transmission power reduction in 3GPP TS 38.213.

In the case of the same priority order and for operation with carrier aggregation (CA), the UE prioritizes power allocation for transmissions on the primary cell of the Master Cell Group (MCG) or the Secondary Cell Group (SCG) over transmissions on a secondary cell. In the case of the same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

SUMMARY

There currently exist certain challenge(s).

To achieve a high throughput on a carrier, a high received Signal to Interference and Noise Ratio (SINR) and thus high transmitted power is needed. For a single carrier this is typically ensured by setting a high nominal $P_0$ value.

The prioritization of power for a Primary Cell (PCell) or a Primary Secondary Cell (PSCell) may, when the UE is power limited, mean that no power at all is available for PUSCH transmission on the Secondary Cell(s) (SCell(s)) in the cell group and thus no data can be received on the SCell(s).

To maximize the throughput in a sector, it may be better to utilize the full available bandwidth (BW) and available power of the UE, than to only utilize part of the available BW.

In order to have power left for transmission of data on the SCell(s), a lower nominal $P_0$ setting may be used. However, if a lower nominal $P_0$ setting is used, no maximum peak rate is achieved when the UE is close to the gNodeB.

Currently, when Uplink Carrier Aggregation is configured the $P_0$ nominal settings for PUSCH transmissions would therefore ideally need to be individually tuned for each cell and UE based on each UE pathloss. However, the pathloss is in general unknown at the Radio Resource Configuration (RRC) configuration of the UE connection.

Thus $P_0$ nominal settings are typically configured to give some average higher UL cell throughput based on an average distribution of UEs.

If most UEs are distributed close to the gNodeB, and less UEs are far away, or if a maximum achievable peak rate is prioritized, then a high $P_0$ nominal setting may be used, whereas if most UEs are distributed further, away a lower $P_0$ nominal setting may be used.

The graph in FIG. 1 illustrates an example of achievable throughput versus distance for a high and low $P_0$ nominal PUSCH settings. The high $P_0$ nominal PUSCH setting is shown by the solid line and the low $P_0$ nominal PUSCH setting is shown by the dashed line. One commonly used method to partly mitigate this problem is to apply a lower a than 1 in the open loop power control (OLPC), but this would still require individual tuning of each gNodeB.

Certain aspects of the present disclosure and their embodiments may provide solutions to these or other challenges.

Embodiments described herein provide methods and apparatuses where the available transmission power is split equally, or at a desired ratio, between the primary cell in a cell group (e.g. PCell or PSCell) and the SCell(s) in the cell group by adjusting the transmission power of the primary cell and SCell respectively.

The UE may periodically, or on demand, report Power Headroom according to 3GPP TS 38.321 v16.4.0 (2021-03) "Medium Access Control (MAC) protocol specification" section 6.1.3.8 "Single Entry PHR MAC CE" or section 6.1.3.9 "Multiple Entry PHR MAC CE".

Power headroom is the difference between maximum transmission power, Pmax, and the used transmission power for the PUSCH transmission according to Open Loop Power Control.

By applying the closed loop transmit power control (TPC) command (f) that is signalled from the gNB to the UE during PDCCH Downlink Control Information (DCI) scheduling, the transmission power of the primary cell can be dynamically adjusted so a desired power headroom is achieved independently of the pathloss.

There are, proposed herein, various embodiments which address one or more of the issues disclosed herein.

According to a first aspect, there is provided a method performed by a base station for adjusting a transmission power of a primary cell of a cell group. The method comprises receiving, from a wireless device, an indication of a first power headroom associated with the primary cell; determining a power headroom target; comparing the first power headroom and the power headroom target; and determining whether to adjust a transmission power of the primary cell based on the comparison.

According to a second aspect A computer program product comprising a computer readable medium having computer readable code embodied therein, the computer readable code being configured such that, on execution by a suitable computer or processor, the computer or processor is caused to perform the method according to the first aspect or any embodiment thereof.

According to a third aspect, there is provided a base station configured to adjust a transmission power of a primary cell of a cell group. The base station is configured to receive, from a wireless device, an indication of a first power headroom associated with the primary cell; determine a power headroom target; compare the first power headroom and the power headroom target; and determine whether to adjust a transmission power of the primary cell based on the comparison.

According to a fourth aspect, there is provided a base station comprises a processor and a memory, said memory containing instructions executable by said processor whereby said base station is operative to adjust a transmission power of a primary cell of a cell group. The base station is configured to receive, from a wireless device, an indication of a first power headroom associated with the primary cell; determine a power headroom target; compare the first power headroom and the power headroom target; and determine whether to adjust a transmission power of the primary cell based on the comparison.

Certain embodiments may provide one or more of the following technical advantage(s).

By dynamically adjusting the transmission power of the primary cell (e.g. PCell or PSCell), a desired power is left for transmission of data also on SCell in the cell group regardless of pathloss. Thus all available BW can be utilized for data transmission and throughput can be increased, as illustrated in FIG. 2, which is a graph illustrating distance versus throughput. FIG. 2 illustrates the throughput for $P_0 = -116$, $P_0 = -106$ (as in FIG. 1) and when the present embodiments are employed (the "CLPC On" line).

A second advantage is that there is less need for individual tuning of $P_0$ settings based on receiver sensitivity. It is thus possible to apply the same $P_0$ setting for all gNodeB in a network.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
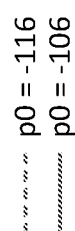
FIG. 1 illustrates an example of achievable throughput versus distance for high and low $P_0$ nominal PUSCH settings.
Figure 2:
FIG. 2 illustrates an example of achievable throughput versus distance for high and low $P_0$ nominal PUSCH settings, and for the techniques described herein.
Figure 3:
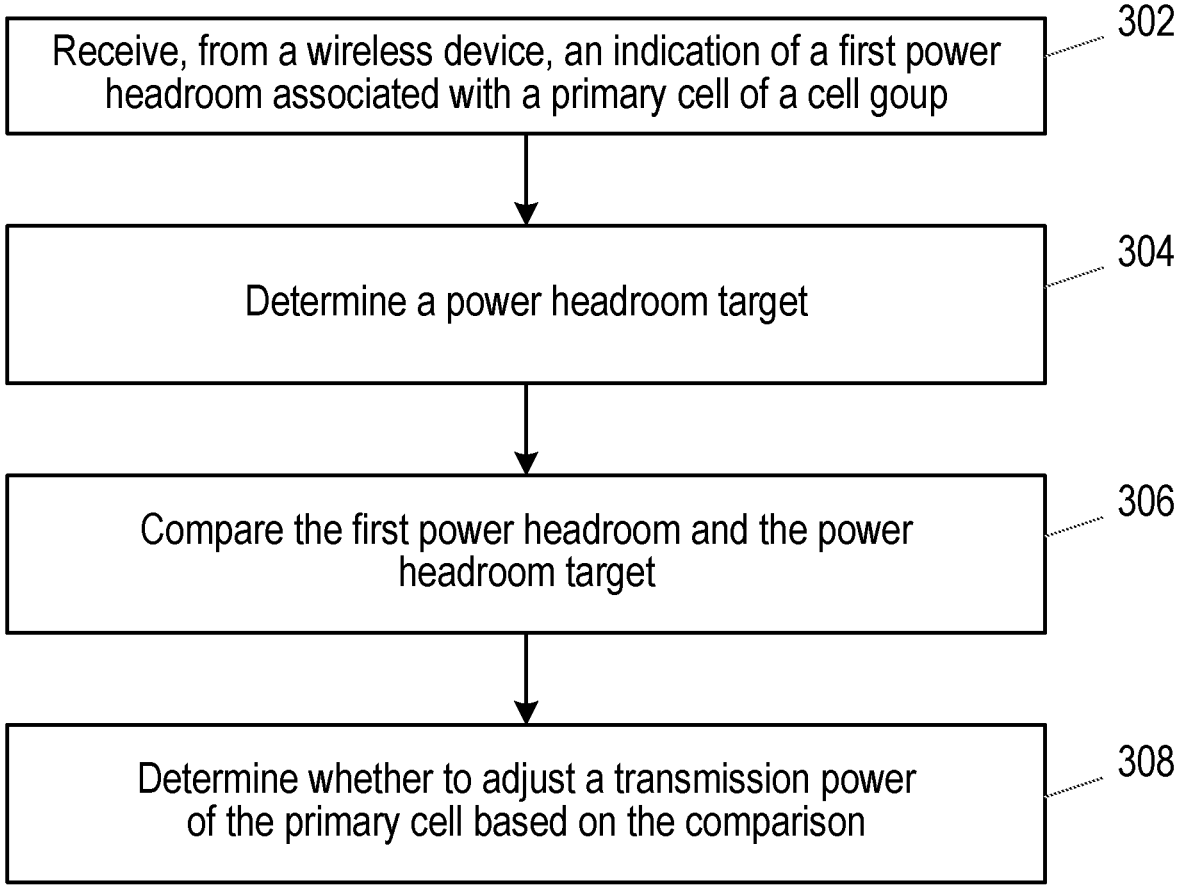
FIG. 3 is a flow chart illustrating a method in accordance with some embodiments.

FIG. 3 depicts a method in accordance with particular embodiments. The method may be performed by a base station for adjusting a transmission power of a primary cell of a cell group (e.g. a Primary Cell, PCell, of a Master Cell Group (MCG) or a Primary Secondary Cell, PSCell, of a Secondary Cell Group (SCG). The method may be used to calculate a desired change of transmission power of the primary cell to achieve a desired power headroom target.

The method begins at step 302 with receiving, from a wireless device, an indication of a first power headroom associated with the primary cell (which is denoted herein as PH_PSCell when the primary cell is a Primary Secondary Cell, PSCell, and denoted PH_PCell when the primary cell is a Primary Cell, PCell). For example, as illustrated below with reference to FIG. 4 step 401, the base station may receive a new power headroom (PHR) report, e.g. a new single or multiple PHR MAC element.

In step 304, the base station determines a power headroom target. The power headroom target can be different if a valid PH report of the SCell(s) in the cell group exist or not.

For example, step 304 may comprise determining whether an indication of a second power headroom, PH_SCell has been received. The indication of the second power headroom, PH_SCell, may be received from the wireless device. The second power headroom, PH_SCell, may be associated with one or more Scells in the cell group of the primary cell for which the indication was received in step 302.

Responsive to the second power headroom, PH_SCell not being received, the base station may set the power headroom target as a predetermined value.

Alternatively, the base station sets the power headroom target as a first target, PHTarget1, calculated based on the bandwidths of the primary cell (PCell or PSCell) and the one or more SCells respectively.

For example, PHTarget1 may be calculated as:

$$PH\text{Target1}=10*Ig((BW_{PScell}+\Sigma BW_{SCell,i})/BW_{PScell})+m \quad [2]$$

where m is a constant margin to account for imperfections in the reporting of PH by the UE, $BW_{PSCell}$ is the bandwidth of the primary cell (PCell or PSCell), and $BW_{SCell}$ is the bandwidth of an SCell in the cell group, where there are i desired SCells.

Thus for the simple case with one (1) primary cell (PCell or PSCell) and one (1) SCell with the same BW, the PHTarget1 will be 3 dB+margin, i.e. power headroom will be slightly above 3 dB, thus allowing at least the same power transmitted from SCell as from the primary cell (PCell or PSCell).

Responsive to the second power headroom, PH_SCell being received, the base station sets the power headroom target, PHTarget2, as a maximum, of the first target, PHTarget1, and the second power headroom, PH_SCell.

In other words, if a valid PH from SCell exist and $P_0$ nominal is set to achieve peak rate when the UE is not power limited the PHTarget2 can instead be calculated as:

$$PH\text{Target2}=\max(\min(PH\_SCell_i);PH\text{Target1}) \quad [3]$$

Thus, the transmission power for the primary cell (PCell or PSCell) will be limited to the transmitted power of SCell which avoids excessive total transmitted power. Further, the expression min(PH_SCell$_i$) will take the minimum PH if more than one SCell is configured.

In step 306, the base station compares the first power headroom and the power headroom target.

Figure 4:
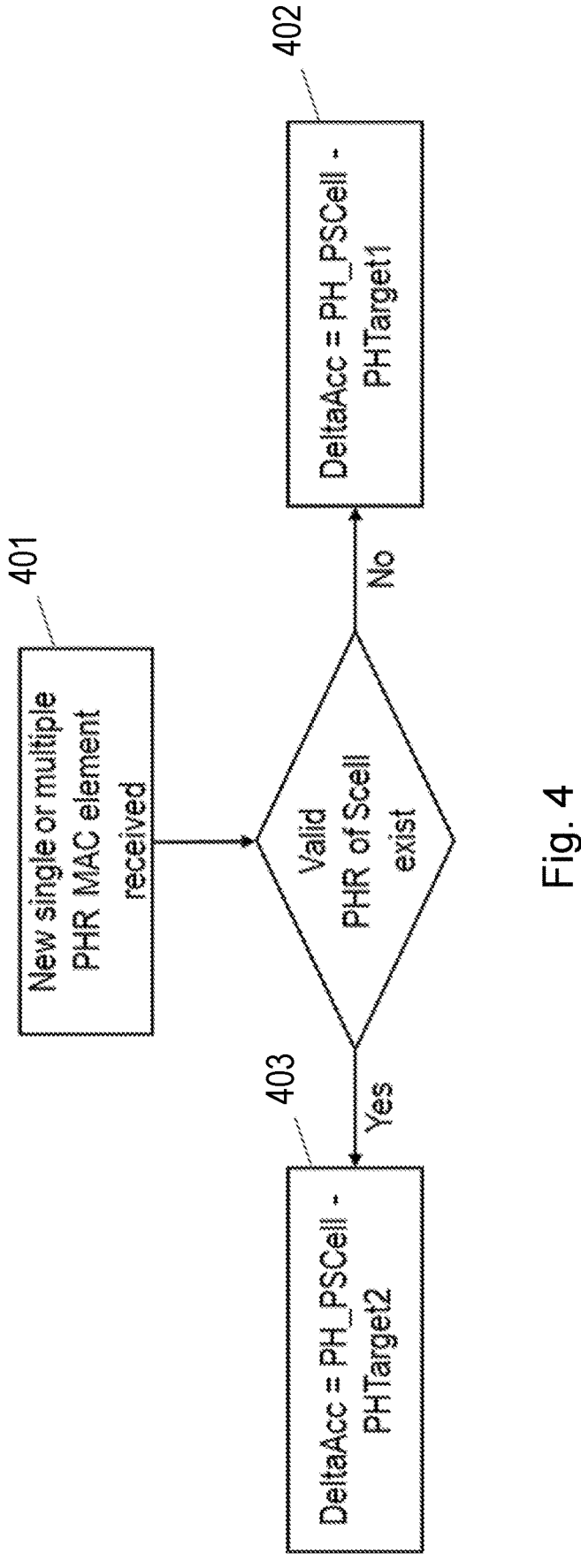
FIG. 4 is a flow chart illustrating a method of calculating a different power headroom target according to some embodiments.

FIG. 4 illustrates a method of calculating a different power headroom target according to some embodiments, and overlaps with the operations in steps 304 and 306 described above.

For example, as illustrated in FIG. 4 steps 402 and 403 the comparison may be performed by subtracting the power headroom target (e.g. PHTarget1 or PHTarget2) from the first power headroom associated with the primary cell (PH_PCell or PH_PSCell) to determine a comparison parameter DeltaAcc.

In step 308, the base station determines whether to adjust a transmission power of the primary cell (PCell or PSCell) based on the comparison. For example, responsive to the comparison indicating that the first power headroom is the same as the power headroom target, the base station determines not to adjust the transmission power of the primary cell (PCell or PSCell).

Responsive to the comparison indicating that the power headroom target is greater than the first power headroom, the base station may determine to decrease the transmission power of the primary cell (PCell or PSCell). Responsive to the comparison indicating that the power headroom target is less than the first power headroom, the base station may determine to increase the transmission power of the primary cell (PCell or PSCell).

In some embodiments, the method in FIG. 3 may further comprise the base station transmitting a command to the wireless device to adjust the transmission power of the primary cell (PCell or PSCell) based on the comparison (i.e. transmitting the command based on the decision in step 308).

Figure 5:
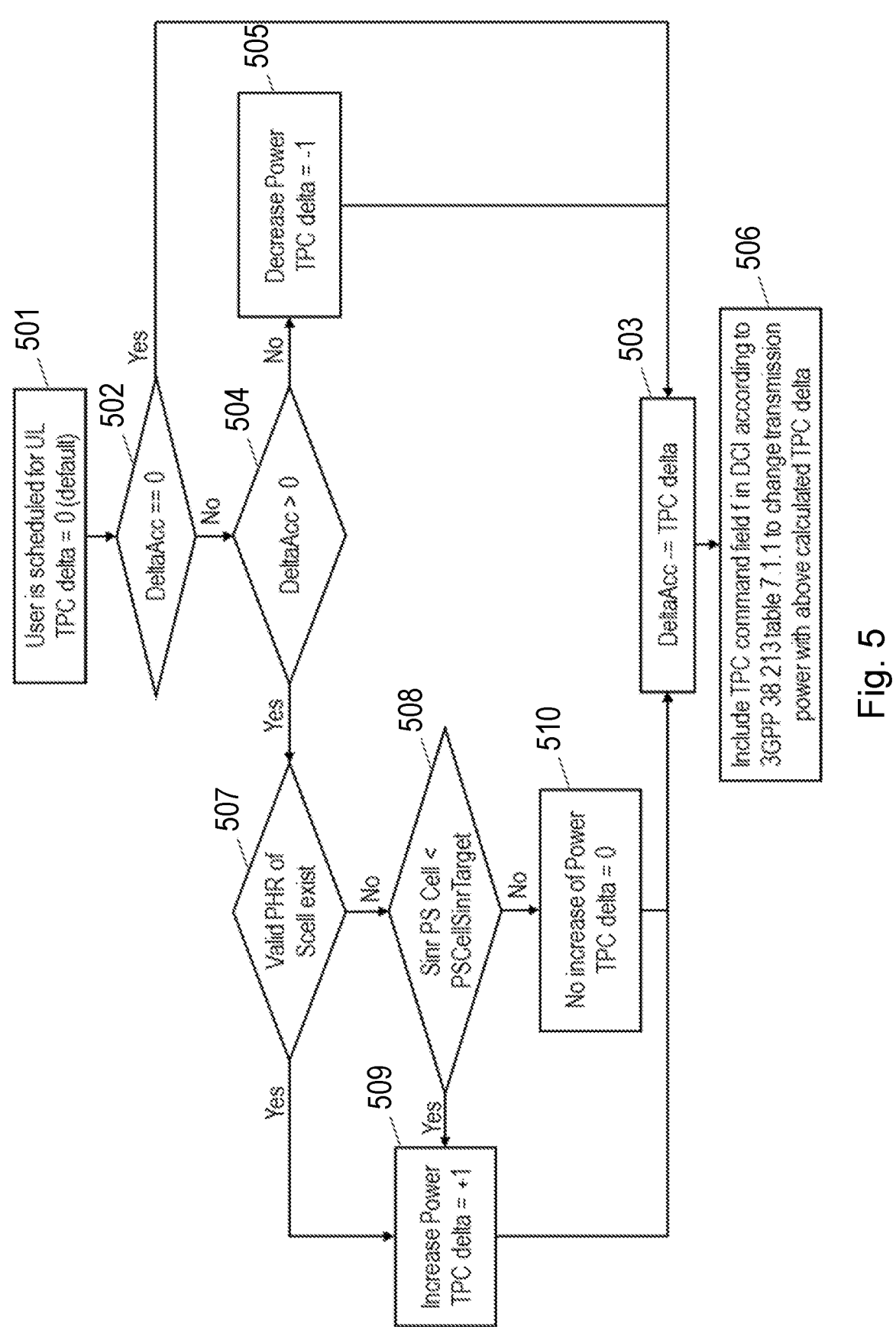
FIG. 5 is a flow chart illustrating how step 308 of FIG. 3 can be performed according to some embodiments.

For example, step 308 may be performed as illustrated in FIG. 5.

FIG. 5 is a flowchart illustrating an example of how step 308 may be performed according to some embodiments.

In step 501 a user (i.e. a UE) is scheduled for uplink and a TPC delta parameter is set to 0.

In step 502, it is determined whether the comparison parameter DeltaAcc is equal to 0. If DeltaAcc is equal to 0 the method passes to step 503 in which the value of TPC delta is subtracted from DeltaAcc. After step 503, the method passes to step 506 in which the base station transmits a TPC command to the wireless device based on the value of TPC delta. In this case, as DeltaAcc is equal to zero, the TPC command instructs no change to the transmission power of the primary cell (PCell or PSCell).

If it is determined in step 502 that DeltaAcc is not equal to 0, the method passes to step 504 in which it is determined whether DeltaAcc is greater than 0.

If DeltaAcc is less than 0, the method passes to step 505, in which the base station determines to decrease the transmission power and accordingly sets the TPC delta parameter to −1. The method then passes to step 503 (where the value of TPC delta is subtracted from DeltaAcc). Then, in step 506, the base station transmits a TPC command to the wireless device based on the value of TPC delta (i.e. a TPC command to decrease the transmission power). For example, if TPC delta is −1, a TPC command can be transmitted to the wireless device to decrease the transmission power of the primary cell (PCell or PSCell) by 1 dB.

The TPC command can be included in TPC command field f in DCI according to 3GPP TS 38.213 table 7.1.1 in order to change the transmission power according to the calculated TPC delta.

If in step 504, it is determined that DeltaAcc is greater than 0, the method passes to step 507 in which the base station determines if a valid PHR exists for the SCell. In some examples, a further step may be included after step 504 in which it is checked whether DeltaAcc>3, and if so, TPC delta is set to +3 dB.

If it is determined in step 507 that a valid PHR for the SCell does not exist, the method passes to step 508 in which the base station determines if the SINR of the primary cell (PCell or PSCell) is less than an SINR target for the primary cell. In the case of a PCell, the SINR target is denoted PCellSinrTarget, and in the case of a PSCell the SINR target is denoted PSCellSinrTarget.

If the SINR of the primary cell (PCell or PSCell) is less than the SINR target, the method passes to step 509 in which the base station determines to increase the transmission power and accordingly sets the TPC delta to +1. The method then passes to step 503 in which the value of TPC delta is subtracted from DeltaAcc, and then the TPC command is sent in step 506.

If the SINR of the primary cell (PCell or PSCell) is greater than or equal to the SINR target, the method passes to step 510 in which the base station determines not to increase the transmission power, and accordingly sets TPC delta to +0. The method then passes to step 503 in which the value of TPC delta is subtracted from DeltaAcc and after step 503 the method passes to step 506 in which the base station transmits a TPC command to the wireless device based on the value of TPC delta (i.e. instructing no change to the transmission power of the primary cell (PCell or PSCell).

If in step 507 it is determined than a valid PHR for the SCell does exist, the method passes to step 509 and proceeds as described above for step 509.

In other words, for every scheduling occasion of a user, a TPC command f (+3, +1, 0, −1 dB) may be applied to the PDCCH DCI scheduling request according to a previously calculated desired change, DeltaAcc of transmission power.

For each transmitted power change the desired DeltaAcc is adjusted for the recently transmitted TPC commands until DeltaAcc becomes 0.

If a new PH report is received before all previously calculated power changes have been applied, these outstanding TPC commands are omitted and the new calculated DeltaAcc is used.

The embodiments described herein may also be applied for Open-Radio Access Network (O-RAN) implementation as there is no dependency to the interface between Baseband and Radio.

It is even more advantageous as the setting of an optimal $P_0$ value may be even more challenging with other vendor's radio equipment with less known about the receiver sensitivity.

Figure 6:
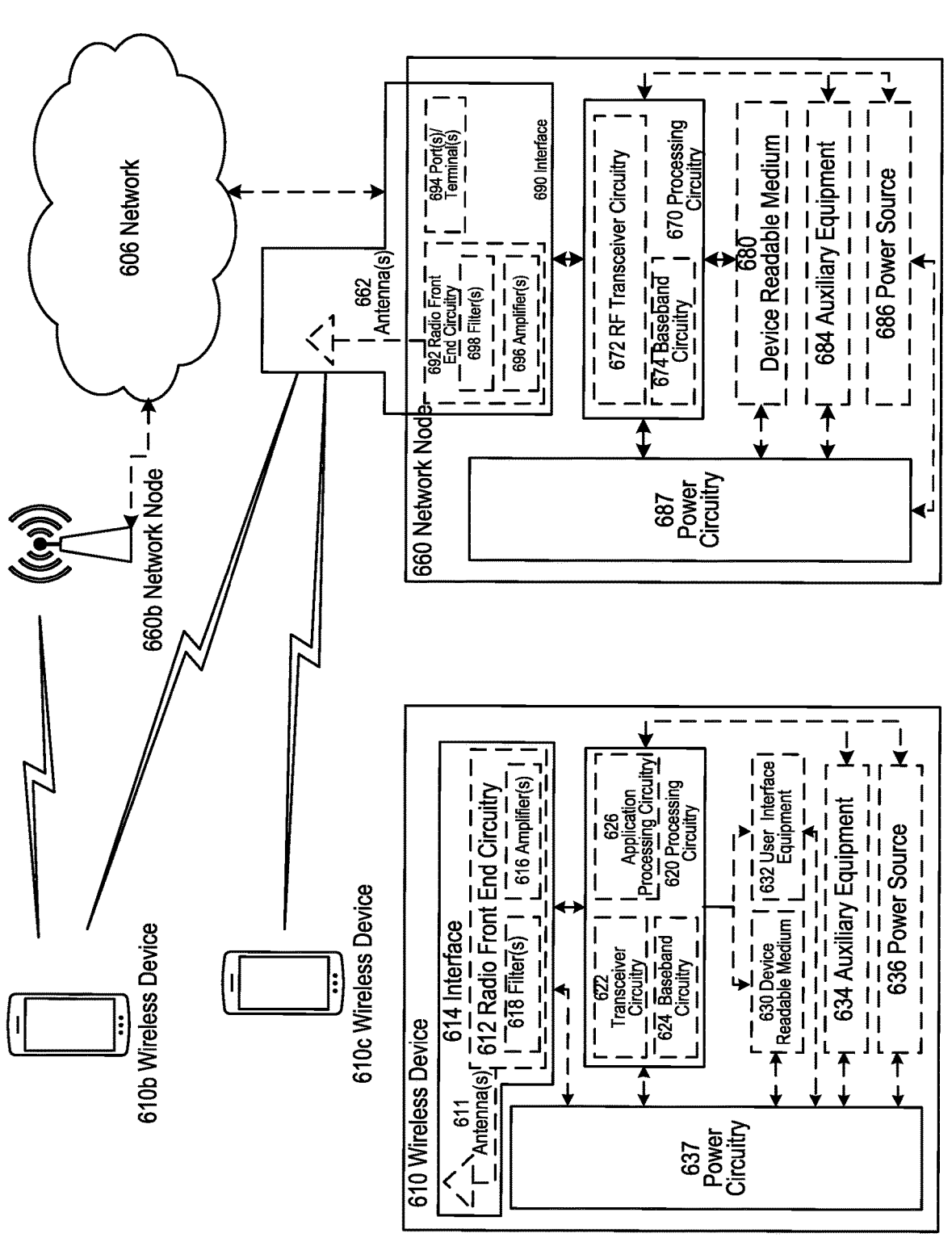
FIG. 6 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
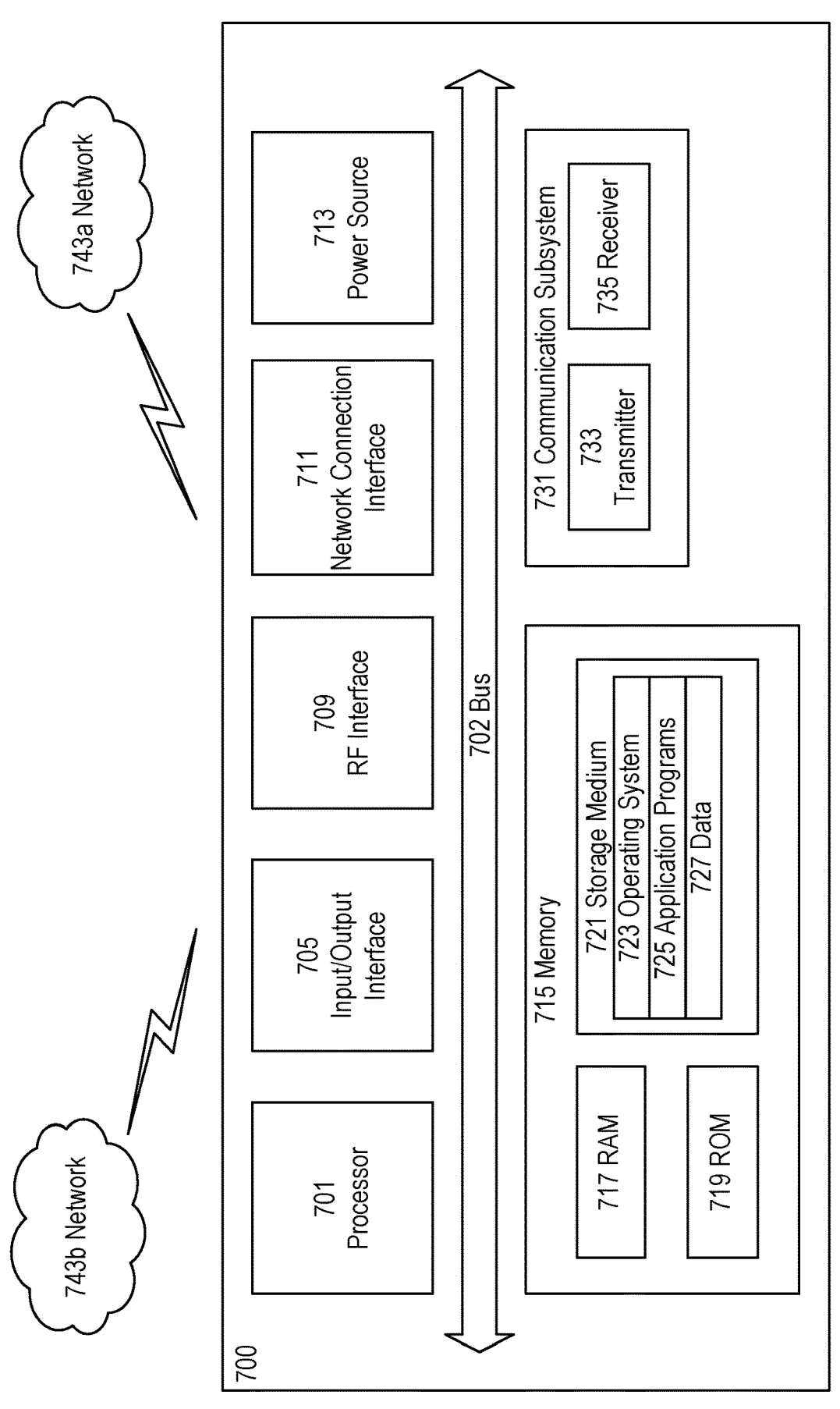
FIG. 7 shows a UE in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the 3rd Generation Partnership Project (3GPP), including a NB-IOT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743*a*. Network 743*a* may encompass wired and/or wireless networks such as a local-area network (LAN), a wide-area network (WAN), a computer network, a wireless network, a telecommunications network, another like network or any combination thereof. For example, network 743*a* may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
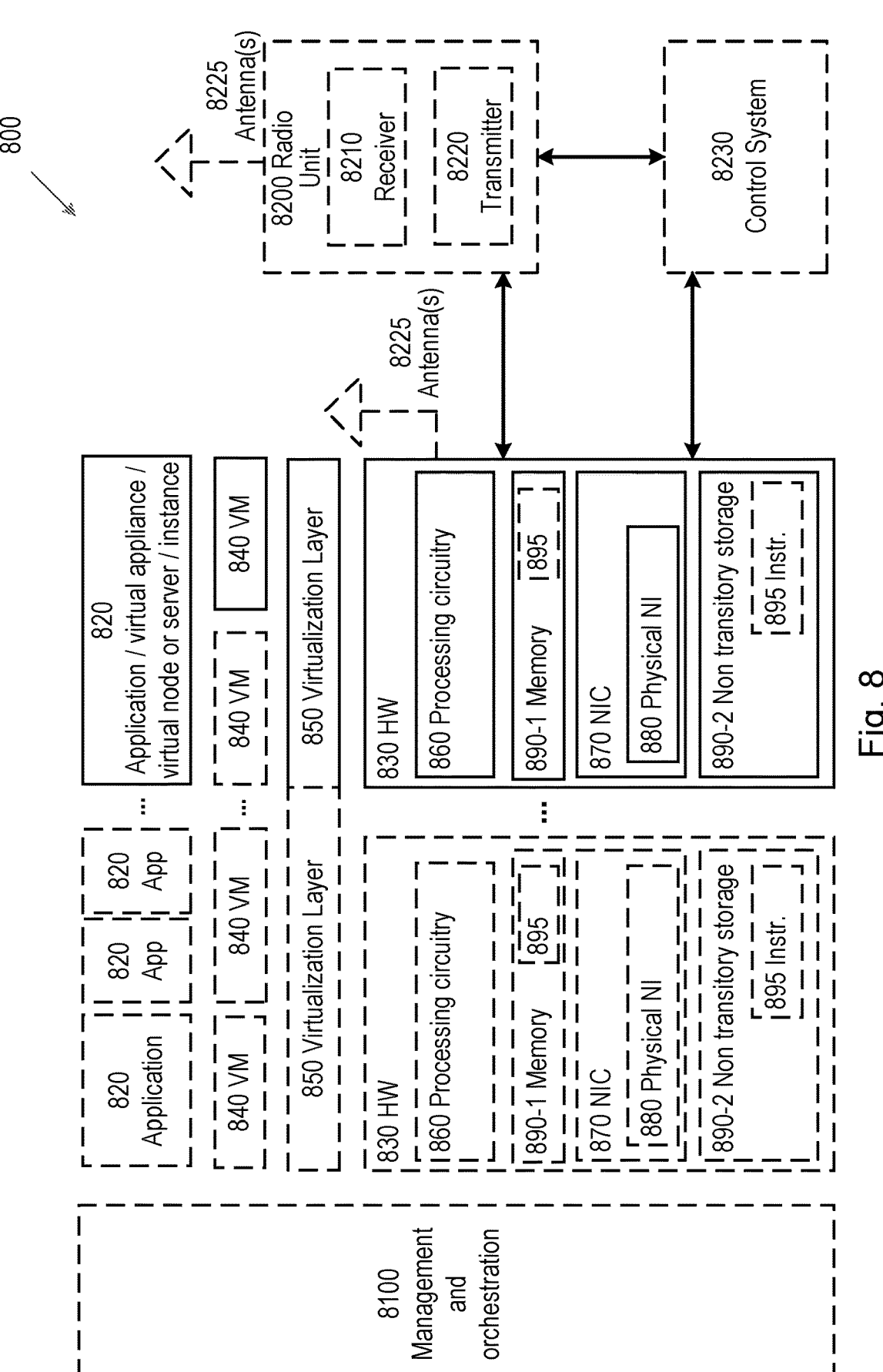
FIG. 8 is a block diagram illustrating a virtualization environment in which functions implemented by some embodiments may be virtualized.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware

830 may be part of a larger cluster of hardware (e.g. such as in a data center or customer premise equipment (CPE) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
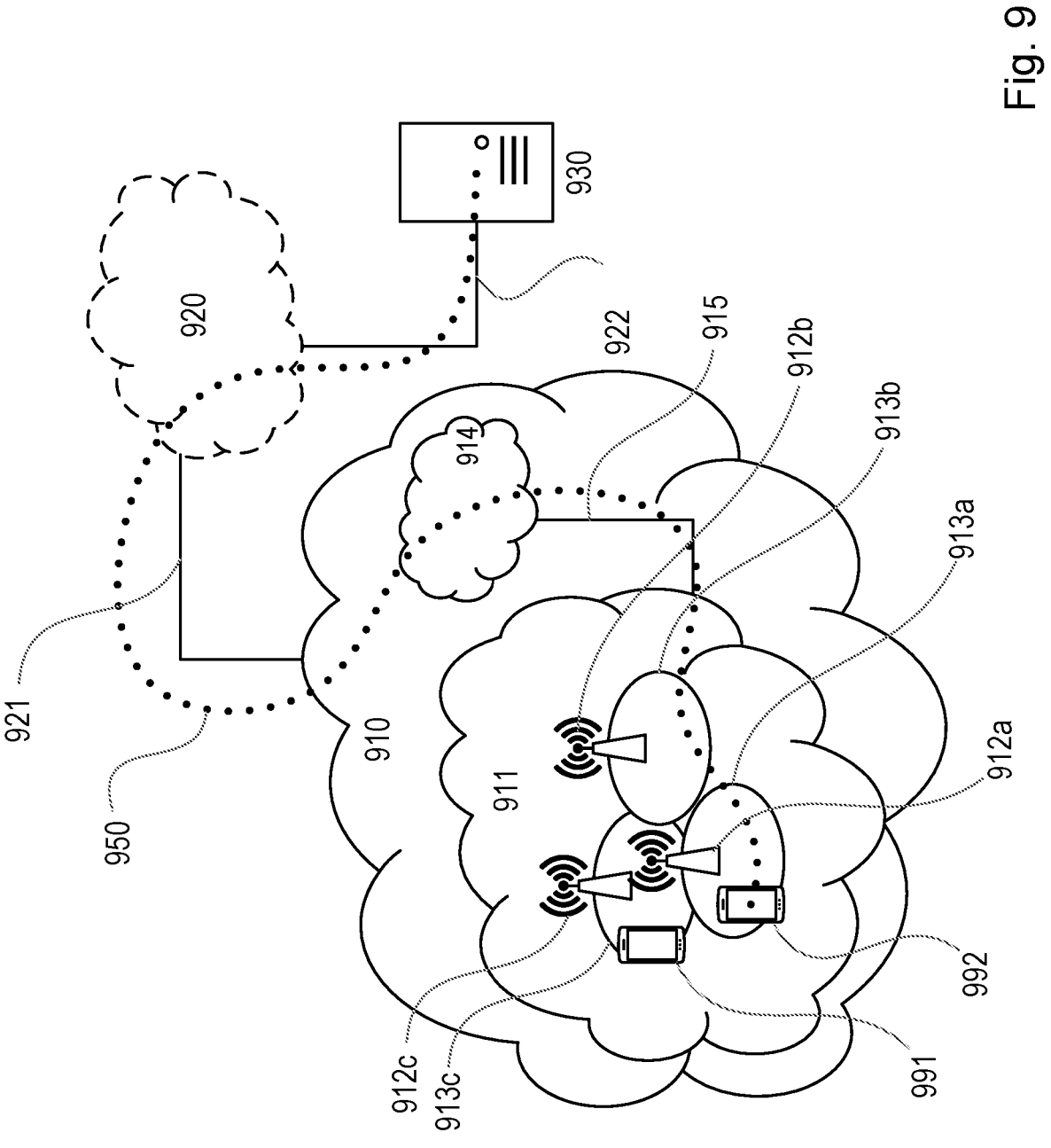
FIG. 9 shows a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signalling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
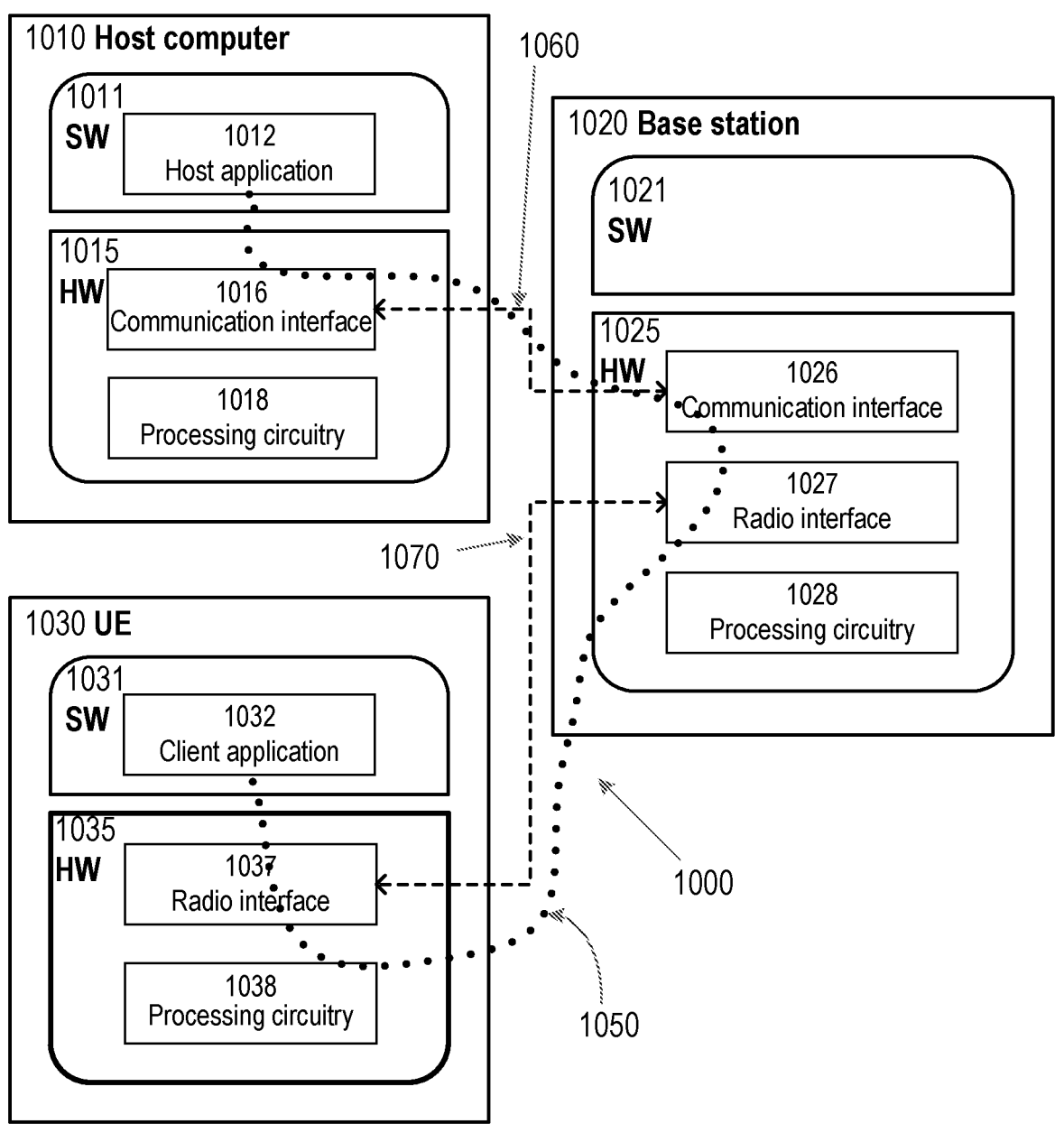
FIG. 10 shows a host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the throughput and thereby provide benefits such as improved performance.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
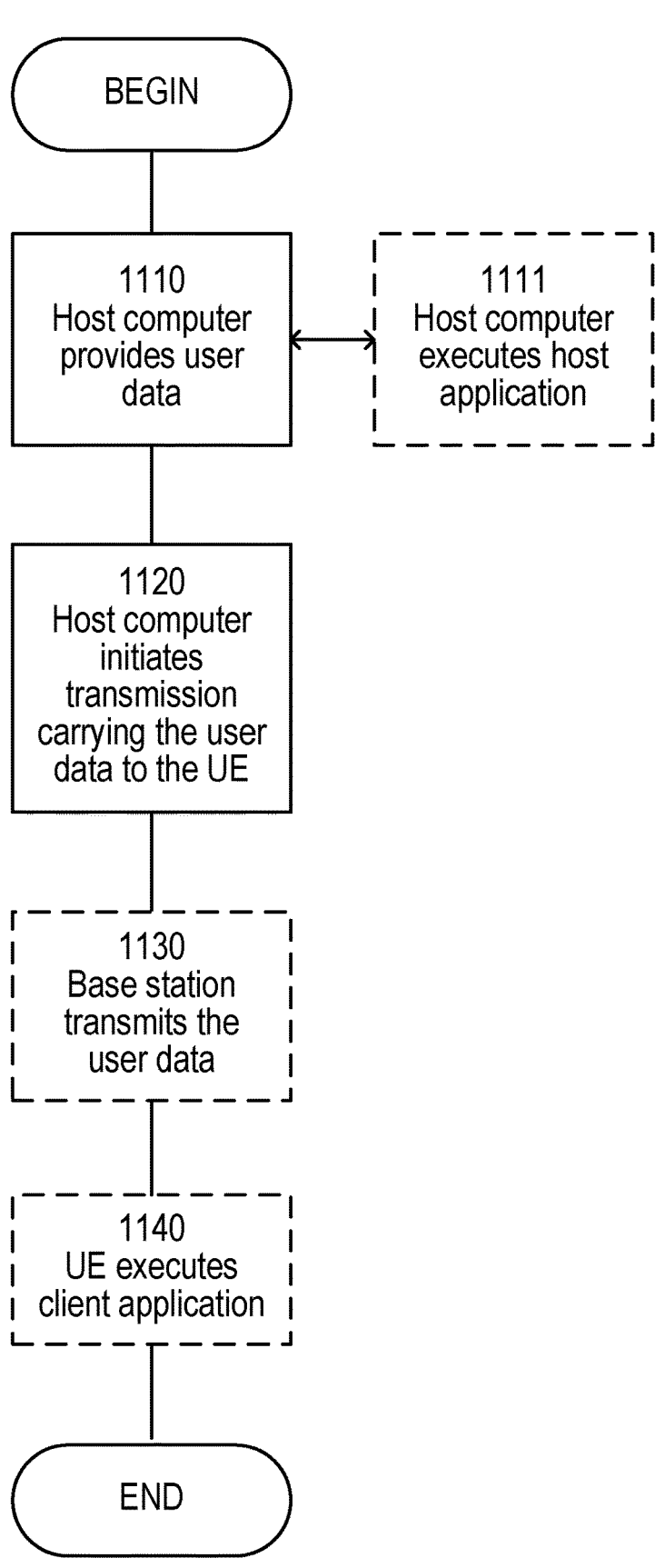
FIGS. 11-14 show methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
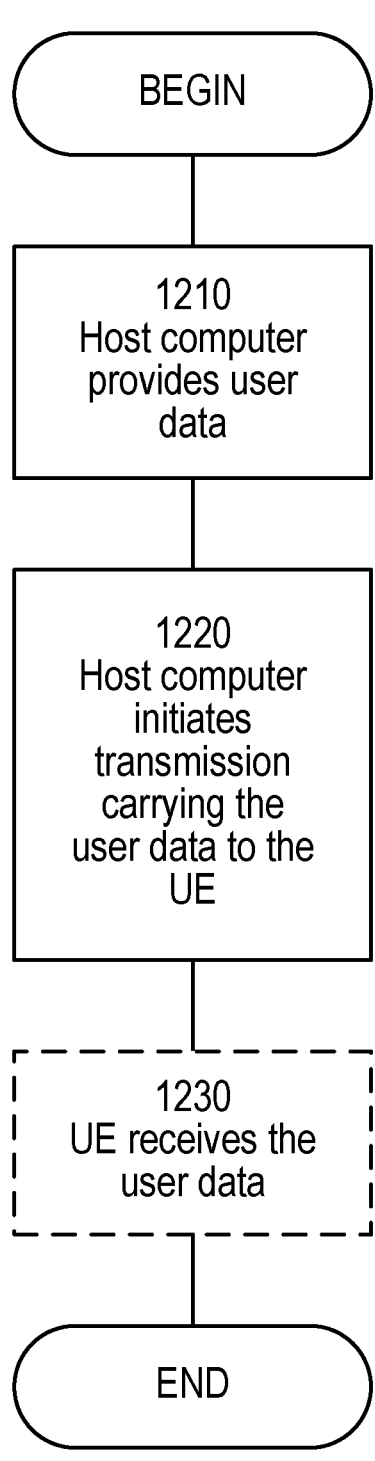

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
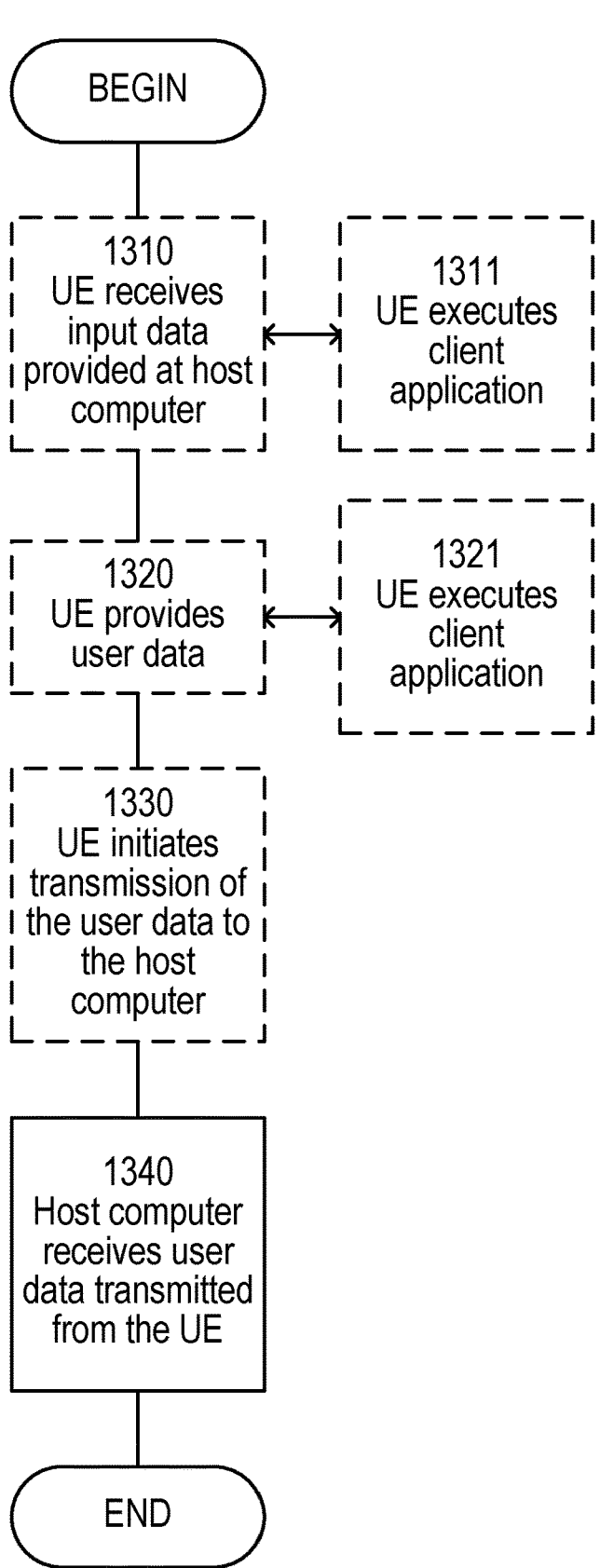

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional)

of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
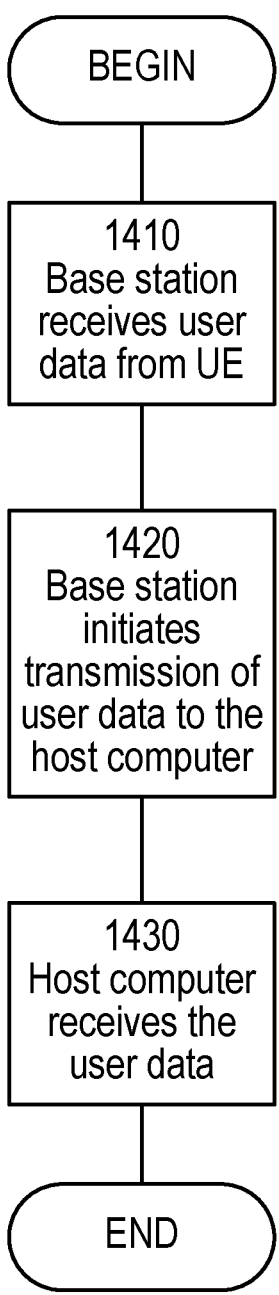

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
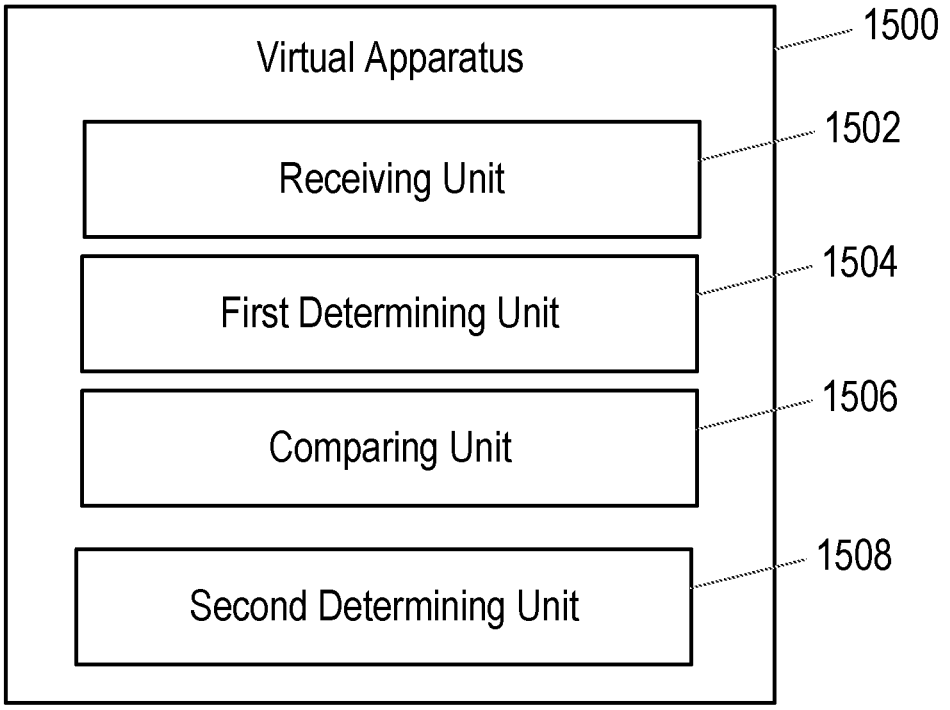
FIG. 15 shows virtualization apparatus in accordance with some embodiments.

FIG. 15 illustrates a schematic block diagram of an apparatus 1500 in a wireless network (for example, the wireless network shown in FIG. 6). The apparatus may be implemented in a wireless device or network node (e.g., wireless device 610 or network node 660 shown in FIG. 6). Apparatus 1500 is operable to carry out the example method described with reference to FIG. 3 and possibly any other processes or methods disclosed herein. It is also to be understood that the method of FIG. 3 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1502, First determining unit 1504, Comparing Unit 1506 and Second determining Unit 1508, and any other suitable units of apparatus 1500 to perform corresponding functions according one or more embodiments of the present disclosure.

As illustrated in FIG. 15, apparatus 1500 includes Receiving unit 1502, First Determining unit 1504, Comparing Unit 1506 and Second Determining unit 1508. Receiving unit 1502 is configured to receive, from a wireless device, an indication of a first power headroom associated with a primary cell of a cell group (e.g. a PCell of a MCG or a PSCell of a SCG). First Determining unit 1504 is configured to determine a power headroom target. Comparing unit 1506 is configured to compare the first power headroom and the power headroom target. The Second Determining unit 1508 is configured to determine whether to adjust a transmission power of the primary cell based on the comparison.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group B Embodiments

1. A method performed by a base station for adjusting a transmission power of a Primary Secondary Cell, the method comprising:
   receiving, from a wireless device, an indication of a first power headroom, PH_PSCell, associated with a Primary Secondary Cell, PS Cell;
   determining a power headroom target;
   comparing the first power headroom and the power headroom target; and
   determining whether to adjust a transmission power of the PS Cell based on the comparison.
2. The method of embodiment 1, wherein the step of determining a power headroom target comprises:
   determining whether an indication of a second power headroom, PH_SCell has been received; and
   responsive to the second power headroom, PH_SCell not being received, performing one of:
      setting the power headroom target as a predetermined value; or
      setting the power headroom target as a first target, PHTarget1, calculated based on bandwidths of the PS Cell and the SCell respectively.
3. The method of embodiment 2 wherein the step of determining a power headroom target further comprises:
   responsive to the second power headroom, PH_SCell being received, setting the power headroom target as a maximum, PHTarget2, of the first target, PHTarget1, and the second power headroom, PH_SCell.

4. The method of embodiment 3, further comprising receiving, from the wireless device, an indication of a second power headroom PH_SCell, associated with a Secondary Cell, SCell.
5. The method of any one of embodiments 1 to 4 wherein the step of determining whether to adjust a transmission power of the PS Cell based on the comparison comprises:
   responsive to the comparison indicating that the first power headroom is the same as the power headroom target, determining not to adjust the transmission power of the PS Cell.
6. The method of any one of embodiments 1 to 5 further comprising:
   responsive to the comparison indicating that the power headroom target is greater than the first power headroom, determining to decrease the transmission power of the PS Cell.
7. The method of any one of embodiments 1 to 6 further comprising:
   responsive to the comparison indicating that the power headroom target is less than the first power headroom, determining to increase the transmission power of the PS Cell.
8. The method of embodiment 1 to 7 further comprising:
   transmitting a command to the wireless device to adjust the transmission power of the PS Cell based on the comparison.
9. The method of any of the previous embodiments, further comprising:
   obtaining user data; and
   forwarding the user data to a host computer or a wireless device.

Group C Embodiments

10. A base station for adjusting a transmission power of a Primary Secondary Cell, the base station comprising:
    processing circuitry configured to perform any of the steps of any of the Group B embodiments;
    power supply circuitry configured to supply power to the base station.
11. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.
12. The communication system of the previous embodiment further including the base station.
13. The communication system of the previous 2 embodiments, further including the UE, wherein the UE is configured to communicate with the base station.
14. The communication system of the previous 3 embodiments, wherein:
    the processing circuitry of the host computer is configured to execute a host application, thereby providing the user data; and
    the UE comprises processing circuitry configured to execute a client application associated with the host application.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

16. The method of the previous embodiment, further comprising, at the base station, transmitting the user data.

17. The method of the previous 2 embodiments, wherein the user data is provided at the host computer by executing a host application, the method further comprising, at the UE, executing a client application associated with the host application.

18. A user equipment (UE) configured to communicate with a base station, the UE comprising a radio interface and processing circuitry configured to performs the of the previous 3 embodiments.

19. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

20. The communication system of the previous embodiment further including the base station.

21. The communication system of the previous 2 embodiments, further including the UE, wherein the UE is configured to communicate with the base station.

22. The communication system of the previous 3 embodiments, wherein:

the processing circuitry of the host computer is configured to execute a host application;

the UE is configured to execute a client application associated with the host application, thereby providing the user data to be received by the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio DTX Discontinuous Transmission

Transmission Technology DTCH Dedicated Traffic Channel

3GPP 3rd Generation Partnership DUT Device Under Test

Project E-CID Enhanced Cell-ID (positioning 5G 5th Generation method)

ABS Almost Blank Subframe E-SMLC Evolved-Serving Mobile

ARQ Automatic Repeat Request Location Centre

AWGN Additive White Gaussian Noise ECGI Evolved CGI

BCCH Broadcast Control Channel eNB E-UTRAN NodeB

BCH Broadcast Channel ePDCCH enhanced Physical Downlink

CA Carrier Aggregation Control Channel

CC Carrier Component E-SMLC evolved Serving Mobile Location

CCCH SDU Common Control Channel SDU Center

CDMA Code Division Multiplexing E-UTRA Evolved UTRA

Access E-UTRAN Evolved UTRAN

CGI Cell Global Identifier FDD Frequency Division Duplex

CIR Channel Impulse Response FFS For Further Study

CP Cyclic Prefix GERAN GSM EDGE Radio Access

CPICH Common Pilot Channel Network

CPICH Ec/No CPICH Received energy per gNB Base station in NR chip divided by the power GNSS Global Navigation Satellite density in the band System CQI Channel Quality information GSM Global System for Mobile C-RNTI Cell RNTI communication CSI Channel State Information HARQ Hybrid Automatic Repeat DCCH Dedicated Control Channel Request DL Downlink HO Handover DM Demodulation HSPA High Speed Packet Access DMRS Demodulation Reference Signal HRPD High Rate Packet Data DRX Discontinuous Reception LOS Line of Sight LPP LTE Positioning Protocol PDP Profile Delay Profile LTE Long-Term Evolution PDSCH Physical Downlink Shared MAC Medium Access Control Channel MBMS Multimedia Broadcast Multicast PGW Packet Gateway Services PHICH Physical Hybrid-ARQ Indicator MBSFN Multimedia Broadcast multicast Channel service Single Frequency PLMN Public Land Mobile Network Network PMI Precoder Matrix Indicator MBSFN ABS MBSFN Almost Blank Subframe PRACH Physical Random Access MDT Minimization of Drive Tests Channel MIB Master Information Block PRS Positioning Reference Signal MME Mobility Management Entity PSS Primary Synchronization Signal MSC Mobile Switching Center PUCCH Physical Uplink Control Channel NPDCCH Narrowband Physical Downlink PUSCH Physical Uplink Shared Channel Control Channel RACH Random Access Channel NR New Radio QAM Quadrature Amplitude OCNG OFDMA Channel Noise Modulation Generator RAN Radio Access Network OFDM Orthogonal Frequency Division RAT Radio Access Technology Multiplexing RLM Radio Link Management OFDMA Orthogonal Frequency Division RNC Radio Network Controller Network PMI Precoder Matrix Indicator Multiple Access RNTI Radio Network Temporary OSS Operations Support System Identifier OTDOA Observed Time Difference of RRC Radio Resource Control Arrival RRM Radio Resource Management O&M Operation and Maintenance RS Reference Signal PBCH Physical Broadcast Channel RSCP Received Signal Code Power P-CCPCH Primary Common Control RSRP Reference Symbol Received
  Physical Channel Power OR Reference Signal
PCell Primary Cell Received Power
PCFICH Physical Control Format RSRQ Reference Signal Received
  Indicator Channel Quality OR Reference Symbol
PDCCH Physical Downlink Control Received Quality Channel RSSI Received Signal Strength
  Indicator TOA Time of Arrival
RSTD Reference Signal Time TSS Tertiary Synchronization Signal
  Difference TTI Transmission Time Interval
SCH Synchronization Channel UE User Equipment
SCell Secondary Cell UL Uplink
SDU Service Data Unit UMTS Universal Mobile
SFN System Frame Number Telecommunication System
SGW Serving Gateway USIM Universal Subscriber Identity
SI System Information Module
SIB System Information Block UTDOA Uplink Time Difference of Arrival
SNR Signal to Noise Ratio UTRA Universal Terrestrial Radio
SON Self Optimized Network Access
SS Synchronization Signal UTRAN Universal Terrestrial Radio
SSS Secondary Synchronization Access Network Signal WCDMA Wide CDMA
TDD Time Division Duplex WLAN Wide Local Area Network
TDOA Time Difference of Arrival

The invention claimed is:

1. A method performed by a base station for adjusting a transmission power of a primary cell of a cell group, the method comprising:

receiving, from a wireless device, an indication of a first power headroom, PH_PSCell, associated with the primary cell;

determining a power headroom target;

comparing the first power headroom and the power headroom target; and determining whether to adjust a transmission power of the primary cell based on the comparison; and wherein the step of determining a power headroom target comprises:

determining whether an indication of a second power headroom, PH_SCell, associated with one or more Secondary Cells, SCells, in the cell group has been received; and responsive to the second power headroom, PH_SCell, not being received, performing one of:

setting the power headroom target as a predetermined value; or setting the power headroom target as a first target, PHTarget1, calculated based on bandwidths of the primary cell and the one or more SCells respectively.

2. The method of claim 1, wherein the step of determining a power headroom target further comprises:

responsive to the second power headroom, PH_SCell, being received, setting the power headroom target, PHTarget2, as a maximum of the first target, PHTarget1, and the second power headroom, PH_SCell.

3. The method of claim 2, further comprising receiving, from the wireless device, the indication of the second power headroom, PH_SCell, associated with the one or more Secondary Cells, SCells.

4. The method of claim 1, wherein the step of determining whether to adjust a transmission power of the primary cell based on the comparison comprises:

responsive to the comparison indicating that the first power headroom is the same as the power headroom target, determining not to adjust the transmission power of the primary cell.

5. The method of claim 1, further comprising:

responsive to the comparison indicating that the power headroom target is greater than the first power headroom, determining to decrease the transmission power of the primary cell.

6. The method of claim 1, further comprising:

responsive to the comparison indicating that the power headroom target is less than the first power headroom, determining to increase the transmission power of the primary cell.

7. The method of claim 1, further comprising:

transmitting a command to the wireless device to adjust the transmission power of the primary cell based on the comparison.

8. The method of claim 1, further comprising:

a. obtaining user data; and b. forwarding the user data to a host computer or a wireless device.

9. The method of claim 1, wherein the primary cell is a Primary Cell, PCell, of a Master Cell Group, MCG, or a Primary Secondary Cell, PSCell, of a Secondary Cell Group.

10. A computer program product comprising a non-transitory computer readable medium storing a computer program comprising instructions which, when executed on processing circuitry, cause the processing circuitry to carry out the steps of the method of claim 1.

11. A base station configured for adjusting a transmission power of a primary cell of a cell group, the base station comprises a processor and a memory, said memory containing instructions executable by said processor whereby said base station is operative to:

receive, from a wireless device, an indication of a first power headroom, PH_PSCell, associated with the primary cell;

determine a power headroom target;

compare the first power headroom and the power headroom target; and determine whether to adjust a transmission power of the primary cell based on the comparison, wherein the step of determine a power headroom target comprises:

determine whether an indication of a second power headroom, PH_SCell, associated with one or more Secondary Cells, SCells, in the cell group has been received; and responsive to the second power headroom, PH_SCell, not being received, perform one of:

set the power headroom target as a predetermined value; or set the power headroom target as a first target, PHTarget1, calculated based on bandwidths of the primary cell and the one or more SCells respectively.

12. The base station of claim 11, wherein the base station is further operative to determine the power headroom target by:

responsive to the second power headroom, PH_SCell, being received, setting the power headroom target, PHTarget2, as a maximum of the first target, PHTarget1, and the second power headroom, PH_SCell.

13. The base station of claim 12, further operative to receive, from the wireless device, the indication of the second power headroom, PH_SCell, associated with the one or more Secondary Cells, SCells.

14. The base station of claim 11, wherein the base station is operative to determine whether to adjust a transmission power of the primary cell based on the comparison by:

responsive to the comparison indicating that the first power headroom is the same as the power headroom target, determining not to adjust the transmission power of the primary cell.

15. The base station of claim 11, further operative to:

responsive to the comparison indicating that the power headroom target is greater than the first power headroom, determine to decrease the transmission power of the primary cell.

16. The base station of claim 11, further operative to:

responsive to the comparison indicating that the power headroom target is less than the first power headroom, determine to increase the transmission power of the primary cell.

17. The base station of claim 11, further operative to:

transmit a command to the wireless device to adjust the transmission power of the primary cell based on the comparison.

18. The base station of claim 11, further operative to:

a. obtain user data; and b. forward the user data to a host computer or a wireless device.

* * * * *